US006757729B1

(12) United States Patent
Devarakonda et al.

(10) Patent No.: US 6,757,729 B1
(45) Date of Patent: *Jun. 29, 2004

(54) VIRTUAL ENVIRONMENT MANAGER FOR NETWORK COMPUTERS

(75) Inventors: Murthy Devarakonda, Briarcliff Manor, NY (US); Ajay Mohindra, Yorktown Heights, NY (US); Deborra Jean Zukowski, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,434

(22) Filed: Oct. 7, 1996

(51) Int. Cl.[7] .................. G06F 15/173; G06F 15/16; G06F 9/00
(52) U.S. Cl. .................. 709/226; 709/229; 718/104
(58) Field of Search .................. 395/200.02, 200.06, 395/200.09, 200.2, 694, 680, 682, 683; 718/100, 104; 719/330, 310, 315; 709/200–226, 229

(56) References Cited

U.S. PATENT DOCUMENTS

| | | | | |
|---|---|---|---|---|
| 5,187,787 A | * | 2/1993 | Skeen et al. ............... | 709/314 |
| 5,261,044 A | * | 11/1993 | Dev et al. .................. | 345/855 |
| 5,287,507 A | * | 2/1994 | Hamilton et al. .......... | 719/315 |
| 5,341,477 A | * | 8/1994 | Pitkin et al. ............... | 709/226 |
| 5,408,619 A | * | 4/1995 | Oran .......................... | 707/10 |
| 5,426,421 A | * | 6/1995 | Gray .......................... | 340/3.32 |
| 5,442,791 A | * | 8/1995 | Wrabetz et al. ............ | 709/330 |

(List continued on next page.)

FOREIGN PATENT DOCUMENTS

| | | | |
|---|---|---|---|
| EP | 0780778 | 12/1995 | |
| WO | WO 95 17064 A1 * | 6/1995 | ............ 29/6 |
| WO | WO 9944124 A1 * | 9/1999 | ............ G06F/9/46 |
| WO | WO 9944127 A1 * | 9/1999 | ............ G06F/9/46 |
| WO | WO 9944134 A1 * | 9/1999 | ............ G06F/9/46 |
| WO | WO 0077635 A1 * | 12/2000 | ............ G06F/9/46 |
| WO | WO 0223927 A2 * | 3/2002 | ............ H04Q/7/00 |

OTHER PUBLICATIONS (Berstein) Bernstein, Philip A. "Middleware: A Model for Distributed System Services", pp. 86–98, Feb. 1996.*
Zukowski et al. "Metis: A Thin–Client Application Framework" Jun. 1997, USENIX.*
Waldo, Jim. "Object–oriented programming on the Network." ECOOP'99, 1999.*
Wollrath, Ann. et al. "Simple Activation for Distributed Objects", USENIX, Conference on OO Technologies (COOTS), Jun. 1995.*
Wollrath, Ann et al. "A Distributed Object Model for Java", USENIX, Conference on OO Technologies and Systems (COOTS), Jun. 1996.*
Sun Microsystems. "The Java Language Environment, A White Paper", Oct. 1995.*
Joint Submission, Interoperability Between Microsoft COM and OMG CORBA 2.0, Aug. 1994.*

Primary Examiner—Lewis A. Bullock, Jr.
(74) Attorney, Agent, or Firm—Gail H. Zarich; Anne Vachon Dougherty

(57) ABSTRACT

A system and method for a downloadable just-in-time middleware called VEM that provides access to network services, including system services such as printing and local storage, to applications that run on Network Computers. The VEM configures the default client services and stores information about these services. When an application executing on the Network Computer wishes to use one of the services, it communicates with its local VEM. The VEM returns a handle to the appropriate service to complete the service request.

17 Claims, 5 Drawing Sheets

U.S. PATENT DOCUMENTS

| | | | | |
|---|---|---|---|---|
| 5,475,819 A | * | 12/1995 | Miller et al. | 709/203 |
| 5,483,652 A | | 1/1996 | Sudama et al. | 395/600 |
| 5,734,828 A | * | 3/1998 | Pendse et al. | 709/203 |
| 5,748,896 A | * | 5/1998 | Daly et al. | 709/223 |
| 5,802,530 A | * | 9/1998 | Van Hoff | 345/835 |
| 5,826,000 A | * | 10/1998 | Hamilton | 714/4 |
| 5,838,906 A | * | 11/1998 | Doyle et al. | 709/202 |
| 5,852,722 A | * | 12/1998 | Hamilton | 709/221 |
| 5,870,544 A | * | 2/1999 | Curtis | 709/229 |
| 5,886,697 A | * | 3/1999 | Naughton et al. | 345/473 |
| 6,009,464 A | * | 12/1999 | Hamilton et al. | 709/219 |
| 6,012,100 A | * | 1/2000 | Frailong et al. | 709/250 |
| 6,073,172 A | * | 6/2000 | Frailong et al. | 709/222 |
| 6,131,116 A | * | 10/2000 | Riggins et al. | 709/203 |
| 6,144,960 A | * | 11/2000 | Okada et al. | 707/10 |
| 6,185,611 B1 | * | 2/2001 | Waldo et al. | 709/221 |
| 6,266,774 B1 | * | 7/2001 | Sampath et al. | 713/201 |
| 6,449,642 B2 | * | 9/2002 | Bourke-Dunphy et al. | 709/222 |
| 6,496,858 B1 | * | 12/2002 | Frailong et al. | 709/221 |
| 6,560,656 B1 | * | 5/2003 | O'Sullivan et al. | 709/250 |
| 6,591,290 B1 | * | 7/2003 | Clarisse et al. | 709/205 |
| 6,604,127 B2 | * | 8/2003 | Murphy et al. | 709/203 |

* cited by examiner

VIRTUAL ENVIRONMENT MANAGER FOR NETWORK COMPUTERS

I. BACKGROUND OF THE INVENTION a. Field of the Invention

This invention relates to network computing. More specifically, this invention relates to methods and means for providing access to network services (for example, system services such as printing and local storage) to applications executing on network connected computers.

b. Related Art

As the network computing paradigm becomes ubiquitous, simplified inexpensive desktop computers, known as the Network Computers, that have no means of independent existence will become common place. Such devices may run a low function operating system (for simplicity) and rely on servers for basic system services including local storage, printing, and monitoring. While traditional clients, such as PCs, provide their own basic system services they are also likely to seek additional services from the network.

Existing approaches used to provide these basic system services to applications include the existence of a full-feature operating environment on the Network Computer and/or the requirement that each application provide its own set of needed services. The former approach is not feasible for network clients because these computers are not necessarily equipped with adequate physical resources such as physical memory and attached peripheral devices (e.g., disk drives) to support a full-feature operating environment (e.g., in the case of a Network Computer). The latter approach has the drawback of making each application aware of the platform and environment it can be run under so that it can provide support for necessary basic system services. Further, the former approach adds to the cost of the network clients, while the latter approach adds to the complexity in the design of applications.

II. SUMMARY OF THE INVENTION

It is an object of the present invention to provide a flexible, powerful, and portable means for enabling network based services for clients.

In a preferred embodiment, a downloadable middleware called the Virtual Environment Manager (VEM) is provided. The VEM allows applications to be developed completely independently of the architecture and environment of a client computer and the servers it connects to. For a client (i.e., a network computer) to access a service, the VEM queries a Service Directory Table available on one or more connected servers. The access to the Service Directory Table returns a handle, which is used to connect to the indicated service provider.

III. BRIEF DESCRIPTION OF THE DRAWING

The present invention will be understood by reference to the drawing, wherein.

IV. DETAILED DESCRIPTION OF THE PREFERRED EMBODIMENT

Figure 1:
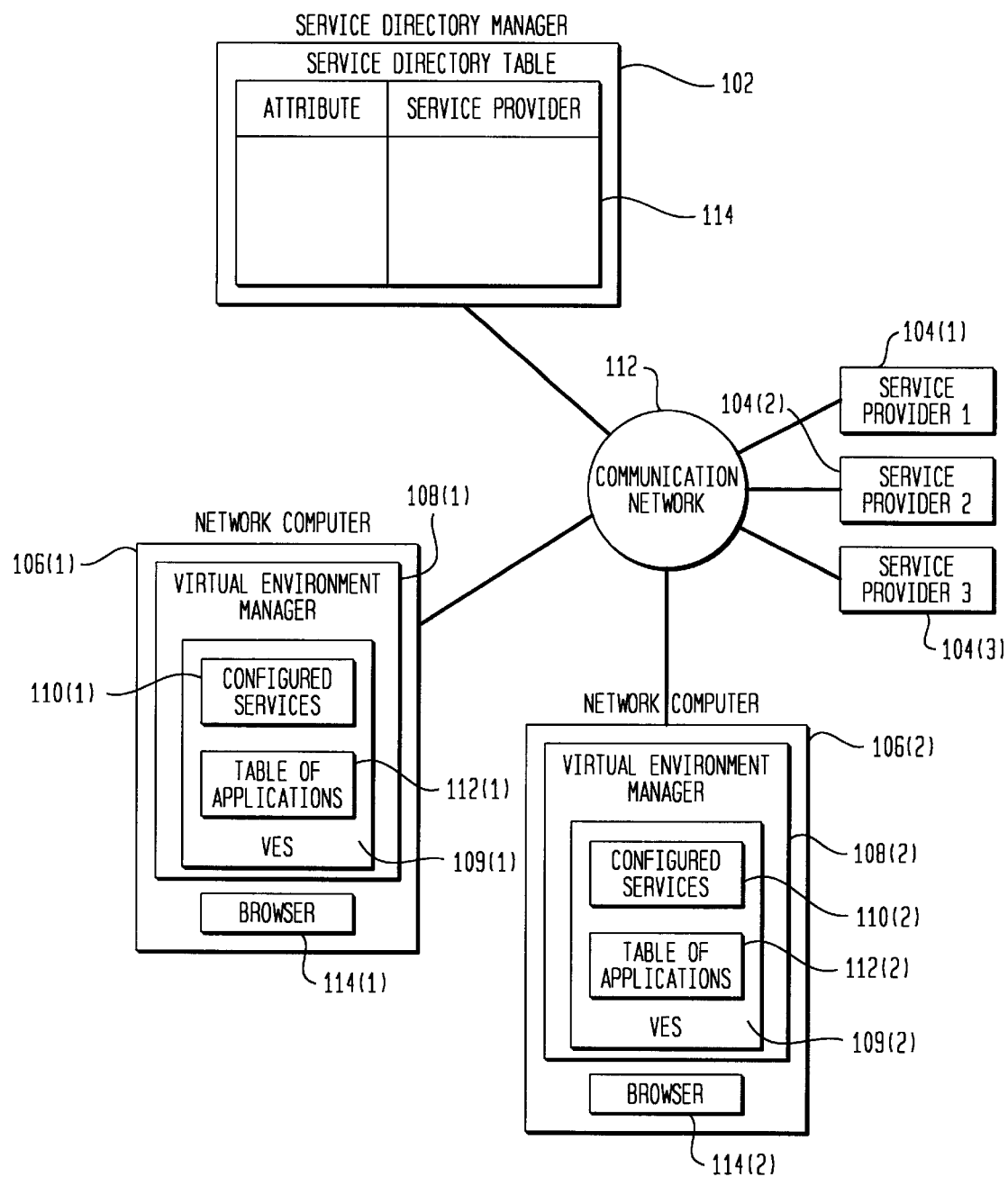
FIG. 1 depicts a loosely coupled system suitable for use with the present invention.

A loosely coupled system suitable for use with the present invention is illustrated in FIG. 1. The system includes several computers 102–106 interconnected by way of a communication network 112. Of these computers, some are known as Network Computers 106(1), 106(2), because they rely on services available via the network to provide many of their basic functions. Others are known as service providers 104(1), 104(2), 104(3) because they provide network services, such as basic system services, to the Network Computers. Some of the computers are also known as Service Directory Managers (SDMs) 102, because they maintain a list of services that are provided to network computers by the service providers.

The Network Computers 106 can be embodied, for example, on a JAVA terminal, a personal digital assistant (PDA) or an internet terminal. The communication protocol is HTTP and TCP/IP. The network 112 can be, for example, a token ring. The service systems 102, 104(1), 104(2), 104(3) can be embodied, for example, on IBM RISC System/6000 machines using AIX 4.2.

A logical organization can be placed on the physical system described above. This organization can be described by a three tier client/server strategy. In this strategy, tier 1 represents the client function, tier 2 represents the service provider and tier 3 represents the data object server (i.e., information storage). The system described in the present embodiment relates to tiers 1 and 2 and the interface in between. The interface in between tiers 2 and 3 is unrestricted, so users can rely on conventional, tried and true data information access systems. Note that a service provider can be designed to either reside completely on a tier 2 server or to allocate its function between tiers 1 and 2 by providing a special service stub.

Each Network Computer includes a Virtual Environment Manager (VEM) 108(1), 108(2) that is downloaded from a Service Provider by way of the communication network 112. The VEM is embodied as program code instantiated in the random access memory (not shown) of the Network Computer. In particular, the VEM provides a base class called VEMCLASS that it relies on for defining a collection of objects (in the sense of "object oriented programming"). One of the objects included in each VEM is an active entity called the Virtual Environment Superviser (VES) 109(1), 109(2) that is responsible for maintaining the VEM state. In a preferred embodiment, the VES is an active JAVA object and is directly instantiated from the VEMCLASS. The VEM state includes a table of configured services 110(1), 110(2) and a table of active applications 112(2), 112(2). Both the table of configured services and the table of active applications are also instantiated in the random access memory of each Network Computer. Applications inherit from the VEMCLASS in order to interact with the VES. The object class is compiled with the application and bound to the name space of the application.

According to an embodiment of the present invention, when a network computer is switched on, it goes through a boot process in which it readies itself for use. At the end of the boot process, the network computer prompts the user for identification. The identification process can be, for example, typing in the user name and a password. After user identity verification, the network computer presents the user with a desktop environment.

The desktop environment is preferably a JAVA container. The JAVA container runs on top of a JAVA virtual machine. Both the container and the JAVA virtual machine are provided by a program such as a Web Browser 114(1), 114(2) (e.g. Netscape Navigator) which executes on the Network Computer. The browser can be downloaded during the Network Computer's boot sequence or provided as an integral part of the Network Computer.

Figure 6:
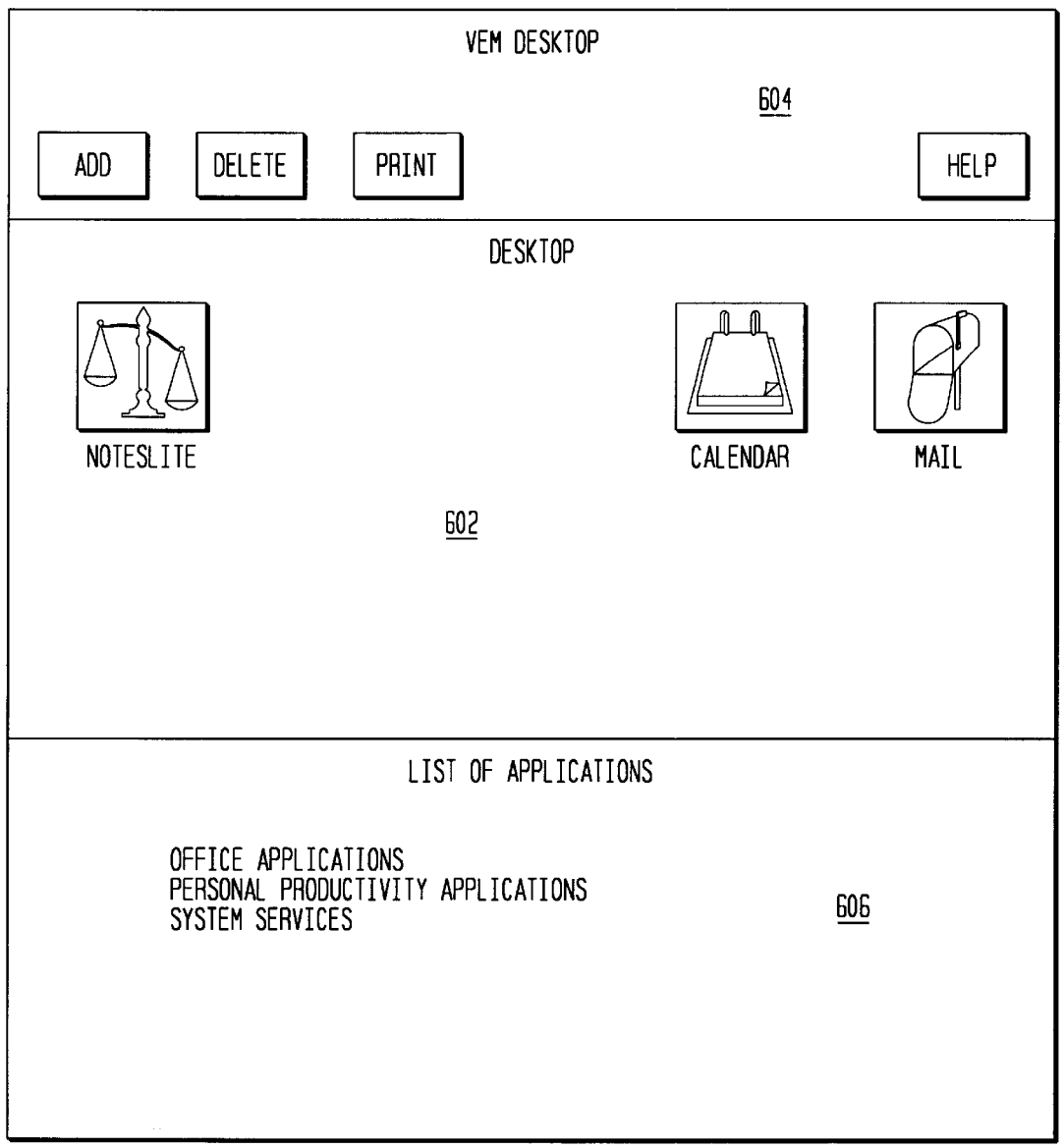

As part of the initialization process, the browser downloads the VES and a configuration file for the user from a Service Provider. The VES uses the configuration file to set up the user's desktop environment (desktop). An example desktop (which can be in the form of a home page) is shown in FIG. 6. The configuration file contains a list of system and application-services that the user accesses most frequently. These system and application services can be embodied as icons 602 or buttons 604 and/or a textual list 606 displayed on the desktop. The system and application services can be accessed as hyperlinks or as direct control buttons where the appropriate JAVA code has been downloaded. The remainder of the VEM is downloaded with user applications.

Figure 2:
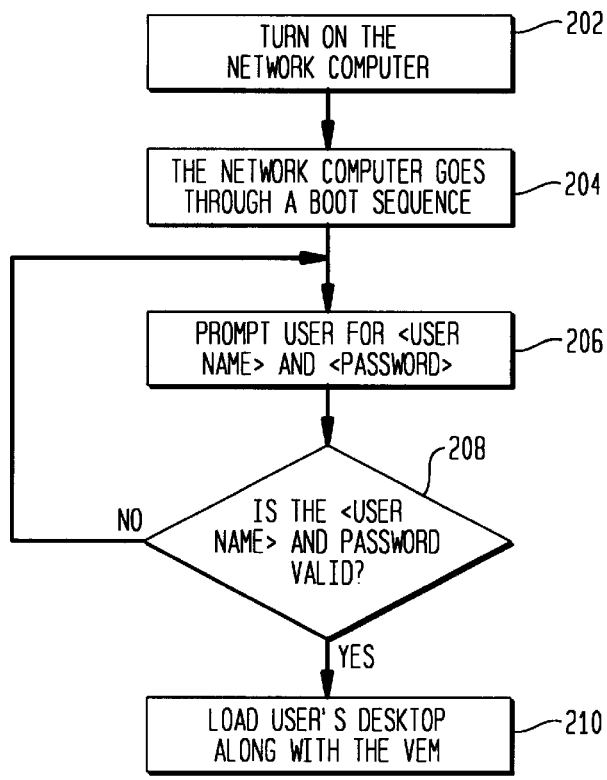
FIG. 2 show the flow chart for the boot phase of the network computer.

The initial logging and download of the home page is described in FIG. 2. In step 202 the Network Computer is powered on or reset by a user. In response, in step 204 the Network Computer commences its machine specific, conventional boot sequence. This sequence can be extended to include downloading of the Web browser. In step 206, the Network Computer prompts the user for a username and password. The Network Computer uses conventional methods to determine if the username and password are valid in step 208. Those of skill in the art will recognize that steps 206 and 208 could alternatively be performed as part of step 204. If step 208 determines that either the username or password are not valid, the method returns to step 206. If the username and password are valid, in step 210 the Network Computer downloads the VES and the configuration file.

When a VES is downloaded for a user, it initiates configuration of all services that are in the configuration file. The configuration file can be of a conventional flat file format. For example, the configuration file can be in the form of a Bookmarks file of the type used by Netscape Navigator 3.0. This configuration is performed by contacting the appropriate service providers and initializing the client's table of services 110 with the server information. Stubs are also downloaded for those services that reside on both tiers 1 and 2.

In addition to the currently configured services, the VES has access to all services available on the network. This enables a user to add any available service to the desktop and as a result to the user's configuration file.

Service access is provided by a Service Directory Manager (SDM) that maintains a table of services referred to as the Service Directory Table (SDT) 114 (shown in FIG. 1). The Service Directory Table contains information about system and application services offered by the Service Providers on the network. It should be understood that there can be a plurality of SDMs on the network, each maintaining a SDT or accessing a single instance of the SDT.

Figure 3:
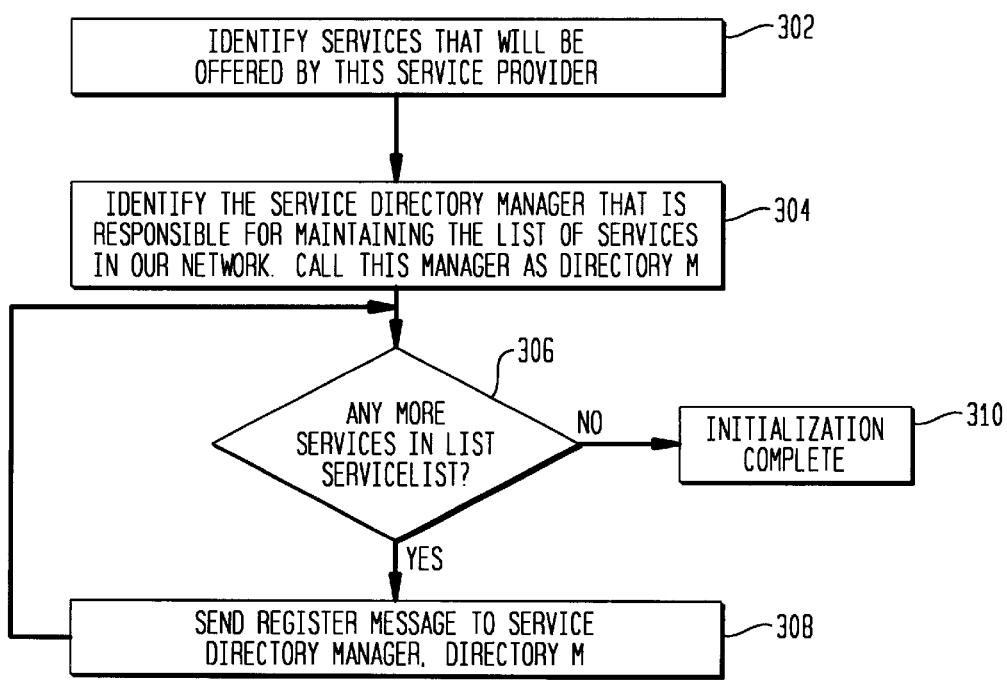
FIG. 3 shows the flow chart for initial steps taken by each service provider.

When a Service Provider is connected to the network, it announces the set of services it offers to the SDM. The steps taken by each Service Provider in announcing the set of services it offers are shown in FIG. 3. In step 302 the Service Provider generates a list of services that it offers. In step 304, the Service Provider identifies the SDM that is responsible for maintaining the list of services in the network. In step 306 the Service Provider scans the list of services and determines the next service to be registered. If there is another service to be registered, in step 308 the Service Provider sends a REGISTER message to the SDM (directory M) and then returns to step 306. If there are no more services in the list, initialization is completed in step 310. It should be understood that steps 306 and 308 can be replaced with a single step in which the entire list is read only once and then sent to the appropriate SDM as part of a single message or message sequence.

Figure 4:
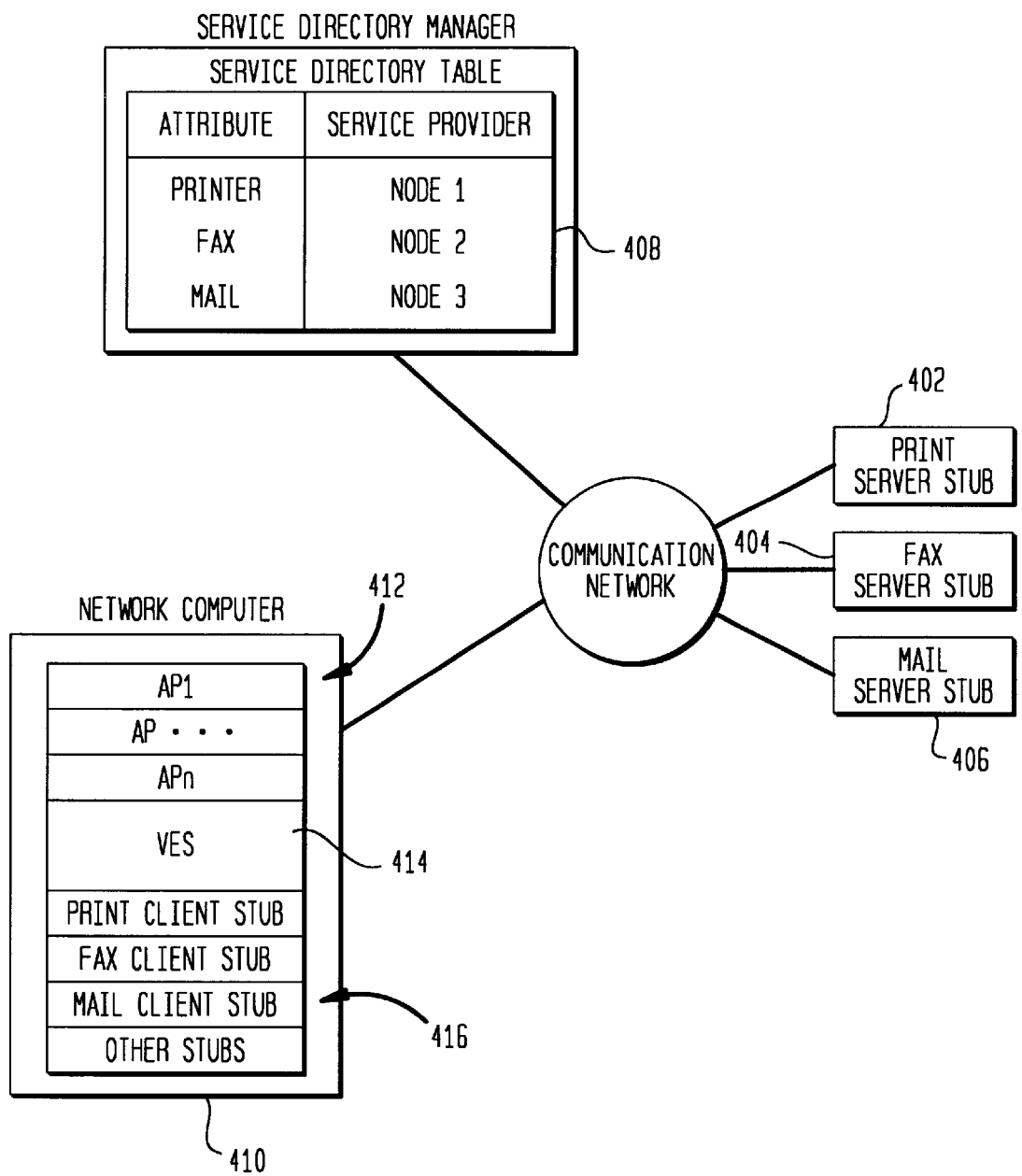
FIG. 4 shows an instance of the system state with the VEM configured.

An instance of the system state in which various client stubs are located at the Network Computers is shown in FIG. 4. The Figure shows three Service Providers: a Print Server 402, a Fax Server 404 and a Mail Server 406. The SDT 408 includes information about the three service providers. In particular, the information describes the type (attribute) of service and the location of the Service Provider which provides the particular service. The particular instance of the Network Computer 410 includes various applications 412 (AP1-APn), an active VES object 414 which contains a table of configured services and passive stub objects 416 (Print Client Stub, Fax Client Stub, Mail Client Stub) that provide connections to the services. The VEM includes the VES, the stubs and the VEMCLASS portion of each application.

Figure 5:
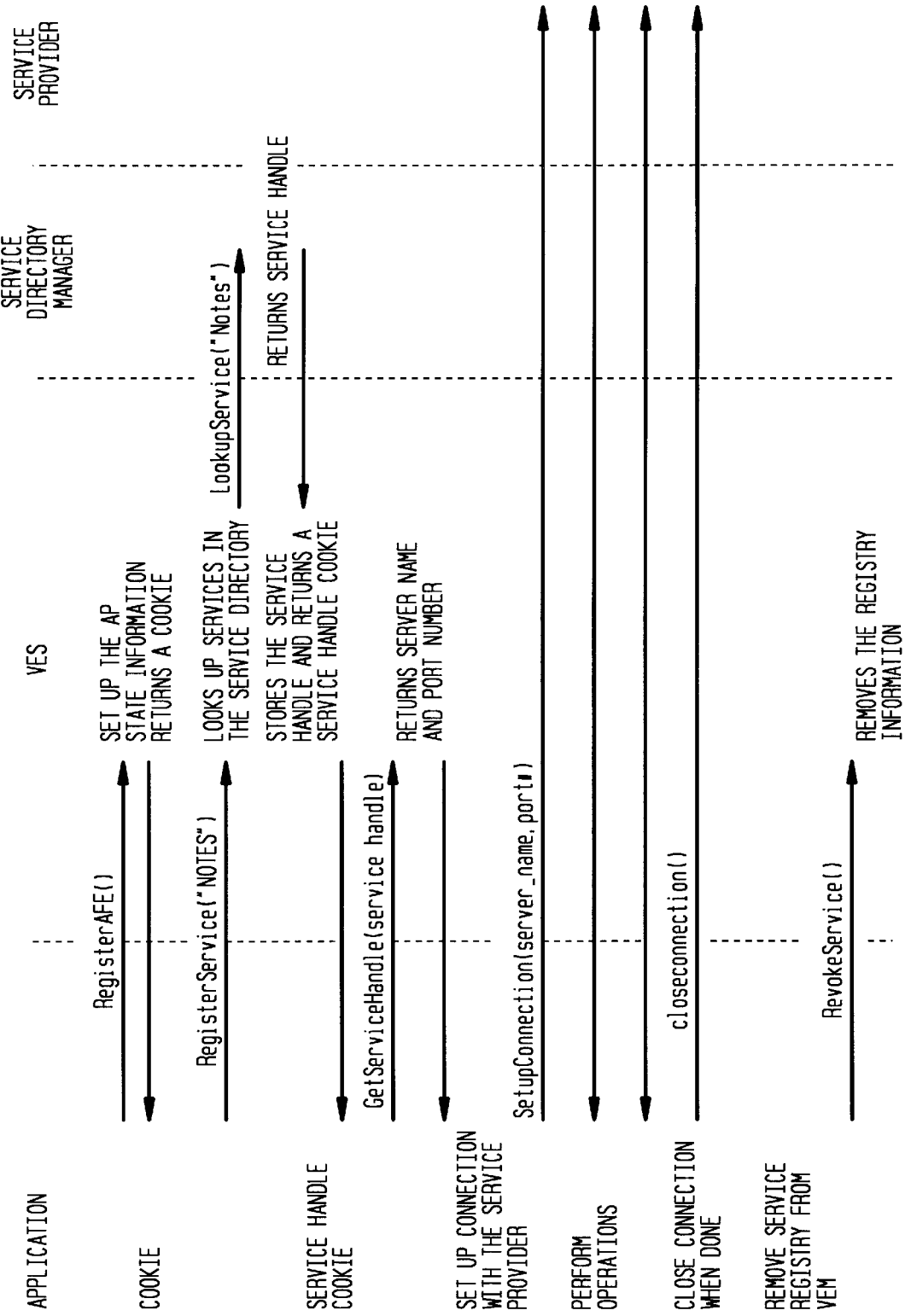
FIG. 5 shows the flow control process for an application when it wishes to use a network service; and, FIG. 6 shows an example desktop.

The VEM will now be discussed in more detail. For reference, code definitions for the VEM include the VEM-CLASS and the client and server interfaces. FIG. 5 shows the flow control process for an application when it wishes to use a network service. As previously discussed, loading the VES into a client is analogous to looking at an HTML page in a browser. The VES is downloaded and it's init( ) method is called. The init( ) method synchronizes itself to ensure that the class variable VE_supervisor is initialized only once. Any subsequent attempts to start a VES are disabled. The VES assigns itself id=0 by setting the VEM_id instance variable. The class variable, num_AFE, is then incremented. A registry (that contains the Configured Services Table 110 and the Table of Applications 112) and a shared_services table are created. Finally, a directory services remote object is instantiated, using the DS_server parameters passed in the html file.

Once the VEM has been downloaded and initialized, applications (APs) can be downloaded. (Note that APs are assumed to be applets in this discussion. The VEM supports applications, though applets are preferred for improved manageability.) In it's init( ) method, an AP should call the registerAFE( ) method. This call sets the AP's instance variable, VEM_id, to the class variable num_AFE, and increments num_AFE. Since num_AFE is never decremented, the AP now has a unique id. The VES is then called to create an entry for the AP in the registry (the Table of Applications 112). At this time, the entry contains only the applet object reference, id and name, but it can be expanded later as needed. The registerAFE( ) method returns a unique key, called a "cookie", to the AP to ensure that access to the AP information in the registry is controlled. The AP is now fully integrated into the VEM environment and is now capable of VEM function.

When the AP needs a service, it first requests the VEM to register the service using one of the registerService( ) methods. On service registration the VES checks the directory service (the SDM) using the LookupService( ) method to get the handle to the service and to see if the service has a stub. If it does, the stub is downloaded. The VEM then adds a service entry to the registry (the Configured Services Table 112) that includes the service's handle and, if appropriate, a reference to the stub. A cookie is passed back to the AP. Once the service is in the registry, both the AP and the VES can access it as needed.

The choice of which registerService( ) method is called depends on: (1) whether a generic service is needed (i.e. one identifiable with just a name), or whether a more custom service is needed (e.g. one that is identified with a list of attributes as well as a name); and (2) whether the service shared. If the service is not shared, then the AP registering the service is the only one that gets access to the cookie. Otherwise, if the service is present, a cookie is passed back that is the same as those given to other APs for the service. If a shared service is not yet available in the VEM, the shared_service variable is updated to reflect the availability of a new, shared service, and a new cookie is passed back to the AP.

Access to shared services can be controlled using an access control list. Alternatively, shared services can be globally available, i.e. any AP can receive the cookie for the service just by asking for the service. Shared services are useful for minimizing the number of server stubs resident on a client. They can also be useful if service behavior changes caused by one AP are used by another interactively.

Shared services can be removed from the VEM in various ways. According to a first embodiment, a reference count is kept for each service. The reference indicates how many APs currently have access to the service. When the reference count reaches zero, the service is removed by the VES. According to an alternative embodiment, only the AP that originally brought in the service is allowed to remove it.

Once the VEM state has been updated to include the service, the AP can get the handle by issuing the getServiceHandle( ) method, or get the stub by using the getServiceInstance( ) method. The AP is then free to make a connection of any sort and use the service. The VEM can be embodied to restrict how an AP and service communicate. When the service is no longer needed, the AP calls the RevokeService( ) method that updates the VEM state as follows: if the service is unique to the AP then the service is removed; if the service is a shared service then it is removed in accordance with the rules discussed above.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A method for dynamically providing access to and interaction with a plurality of network system and application services to an application executing on a network client, said network client having an environment management software system, comprising the steps of:

automatically dynamically determining when the application requires access to at least one of a plurality of remote network system and application services;

in response to a determination that the application requires access to at least one of a plurality of remote network system and application services said environment management software system of said network client performing the steps of:

identifying a plurality of different potential service providers for each particular one of the at least one remote network system and application services;

locating at least one potential service provider from said plurality of different potential remote service providers for the at least one remote network service required by the application on demand; and downloading at least one object comprising executable code into the environment management software system of the network client, the code being capable of local processing, and enabling the application to interact with the at least one remote network service on demand based on the executable code processing.

2. The method of claim 1 wherein the downloading comprises the step of contacting an appropriate service provider and downloading a client stubs for the remote network service.

3. The method of claim 1 wherein the downloading comprises the step of contacting an appropriate service provider and downloading a client handle for the remote network service.

4. The method of claim 1 comprising the further step of providing a user of the network client with a visual display of available network services to which access has been previously enabled.

5. The method of claim 1 wherein the network client is a Network Computer.

6. The method of claim 1 wherein the network client is a JAVA terminal.

7. The method of claim 1 wherein the network client is a personal digital assistant.

8. The method of claim 1 wherein the network service is a system service.

9. The method of claim 8 wherein the system service is a printing service.

10. The method of claim 8 wherein the system service is persistent storage.

11. The method of claim 8 wherein the system service is system monitoring.

12. The method of claim 8 wherein the system service is system management.

13. The method of claim 1 wherein the environment management software system runs on a virtual machine instantiated on the network client.

14. The method of claim 1 comprising the further step of determining when access to the network service is no longer needed; and, initiating a removal of the object from the memory of the network node.

15. The method of claim 1 comprising the further steps of registering by remote service providers with a third party directory, a set of services available to network clients, wherein the object obtains access to the service by reference to the directory.

16. The method of claim 1 comprising the further step of sharing access to the service by a plurality of application executing on the network node.

17. The method of claim 1 comprising the further step of isolating the service needed by an application from other applications by providing access to the service only by way of a unique key known only to the application.

* * * * *